United States Patent
Kim et al.

(10) Patent No.: US 9,026,165 B2
(45) Date of Patent: May 5, 2015

(54) METHOD AND APPARATUS FOR CONTROLLING WIRELESS POWER TRANSMISSION

(75) Inventors: Nam Yun Kim, Seoul (KR); Eun Seok Park, Suwon (KR); Sang Wook Kwon, Hwaseong (KR); Young Tack Hong, Seongnam (KR); Young Ho Ryu, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1043 days.

(21) Appl. No.: 13/078,107

(22) Filed: Apr. 1, 2011

(65) Prior Publication Data

US 2011/0244913 A1   Oct. 6, 2011

(30) Foreign Application Priority Data

Apr. 2, 2010   (KR) .................. 10-2010-0030335

(51) Int. Cl.
*H04B 7/00* (2006.01)
*H04B 5/00* (2006.01)
*H02J 7/02* (2006.01)
*H04W 52/34* (2009.01)

(52) U.S. Cl.
CPC .......... *H04B 5/0037* (2013.01); *H04W 52/343* (2013.01); *H02J 7/025* (2013.01)

(58) Field of Classification Search
USPC ............ 455/522, 69–70, 41.1–41.3; 320/107, 320/108
See application file for complete search history.

(56) References Cited

U.S. PATENT DOCUMENTS

| | | | |
|---|---|---|---|
| 7,791,311 B2* | 9/2010 | Sagoo | 320/108 |
| 2007/0049991 A1* | 3/2007 | Klostermann et al. | 607/60 |
| 2008/0194281 A1 | 8/2008 | Sun et al. | |
| 2010/0034238 A1* | 2/2010 | Bennett | 375/130 |
| 2010/0036773 A1* | 2/2010 | Bennett | 705/67 |
| 2011/0156640 A1* | 6/2011 | Moshfeghi | 320/108 |
| 2012/0164943 A1* | 6/2012 | Bennett | 455/41.1 |
| 2012/0196529 A1* | 8/2012 | Huomo et al. | 455/41.1 |

FOREIGN PATENT DOCUMENTS

| | | |
|---|---|---|
| JP | 2007-036379 | 2/2007 |
| JP | 2009-077375 | 4/2009 |
| KR | 10-2001-0108486 | 12/2001 |
| KR | 10-2006-0100451 | 9/2006 |
| KR | 10-2007-0114168 | 11/2007 |
| KR | 10-2008-0036239 | 4/2008 |
| KR | 10-2009-0056546 | 6/2009 |
| KR | 10-2009-0089941 | 8/2009 |
| KR | 10-2009-0102494 | 9/2009 |
| KR | 10-2009-0121324 | 11/2009 |

* cited by examiner

*Primary Examiner* — Fayyaz Alam
(74) *Attorney, Agent, or Firm* — NSIP Law

(57) ABSTRACT

Provided are a wireless power transmission control method and wireless power transmission control apparatuses. The wireless power transmission control method may include transmitting a wake-up request signal used to wake up a target device, and receiving a response message from the target device activated by the wake-up request signal. A source device may set a demand power based on the response message, and may transmit a resonance power to the target device based on the demand power.

15 Claims, 15 Drawing Sheets

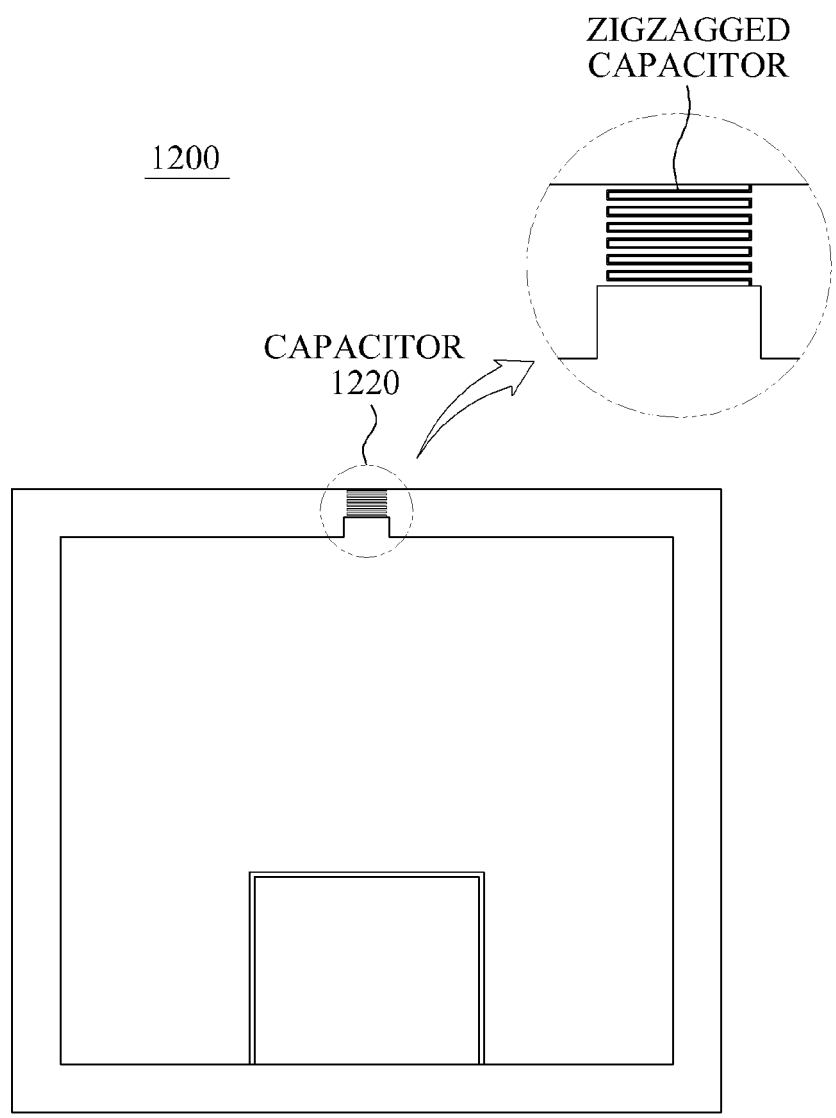

METHOD AND APPARATUS FOR CONTROLLING WIRELESS POWER TRANSMISSION

CROSS-REFERENCE TO RELATED APPLICATION(S)

This application claims the benefit under 35 U.S.C. §119(a) of Korean Patent Application No. 10-2010-0030335, filed on Apr. 2, 2010, in the Korean Intellectual Property Office, the entire disclosure of which is incorporated herein by reference for all purposes.

BACKGROUND

1. Field

The following description relates to a wireless power transmission, and more particularly, to an apparatus and method for controlling wireless power transmission.

2. Description of Related Art

With the development of Information Technology (IT), a variety and the amount of portable electronic devices have increased. Due to characteristics of the portable electronic devices, battery performance of a corresponding portable electronic device is becoming a critical issue. In addition to the portable electronic devices, home electronic appliances that may wirelessly transmit data may be supplied with power over a power line.

Currently, researches are being conducted on wireless power transmission technologies that may wirelessly supply power to the portable electronic devices and/or home appliances. Due to characteristics of a wireless power transmission environment, a distance between a source resonator and a target resonator may vary over time, and requirements to match the source resonator and the target resonator may also changed Accordingly, there is a desire for a method to improve wireless power transmission efficiency even if the distance between the source resonator and the target resonator varies over time and/or if requirements to match the source resonator and the target resonator change.

SUMMARY

In one general aspect, there is provided a wireless power transmission control method, including transmitting a wake-up request signal that is used to wake up a target device, receiving a response message from the target device that is activated by the wake-up request signal, setting a demand power based on the response message, and transmitting a resonance power to the target device based on the set demand power.

The wake-up request signal may comprise an amount of power used to switch the target device to a power receiving mode.

The response message may comprise an identification (ID) of the target device and information about an amount of power to be used by the target device.

The setting may comprise demodulating the response message, verifying an amount of current to be used and an amount of voltage to be used of the target device from the demodulated response message, and setting the demand power based on the used amount of current and the used amount of voltage.

The demand power may be set based on a number of target devices and a reflected power that is reflected from at least one target device.

The wireless power transmission control method may further comprise receiving a check message from the target device that receives the resonance power, wherein the check message comprises an ID and a power receiving state of the target device.

The power receiving state may comprise at least one of information about a battery charging state, whether a power is turned on or off, a reflected power amount, coupling information, and power consumption information.

Resonance power may be transmitted to the target device to supply the target device with a desired amount of power in real-time.

In another aspect, there is provided a wireless power transmission control apparatus, comprising a communication unit to transmit a wake-up request signal to wake up a target device, and to receive a response message from the target device activated by the wake-up request signal, a controller to set a demand power based on the response message, and a source resonator to transmit resonance power corresponding to the demand power, to the target device.

The wake-up request signal may comprise a power used to switch the target device to a power receiving mode.

The response message may comprise an identification (ID) of the target device and information about an amount of power to be used by the target device.

The wireless power transmission control apparatus may further comprise a direct current (DC) level setting unit to set a voltage corresponding to the demand power, a current setting unit to set a current corresponding to the demand power, and a resonance power sensor to sense, in real-time, the resonance power transmitted to the target device.

The resonance power sensor may sense the resonance power transmitted to the target device, in real-time, using an alternating current (AC) power that is coupled at a $\lambda/4$ point in a radio frequency (RF) line, wherein $\lambda$ denotes a wavelength of a resonance frequency.

In another aspect, there is provided a wireless power transmission control apparatus, comprising a target resonator operated at a same resonance frequency as a source resonator, a communication unit to receive a wake-up request signal from a source device, and to transmit a response message to the wake-up request signal to the source device, and a controller that is activated by a resonance power comprised in the wake-up request signal, and configured to generate the response message, wherein the response message comprises an identification (ID) of a target device and information about an amount of power to be used by the target device.

The wireless power transmission control apparatus may further comprise a coupling state detector to detect a coupling state between the source resonator and the target resonator.

The wireless power transmission control apparatus may further comprise a charging state detector to detect a charging state of the target device.

The controller may control the communication unit to periodically or aperiodically transmit a check message comprising the ID and a power receiving state of the target device.

Other features and aspects will be apparent from the following detailed description, the drawings, and the claims.

BRIEF DESCRIPTION OF THE DRAWINGS

FIGS. 7 through 13B are diagrams illustrating various examples of a resonator.

Figure 1:
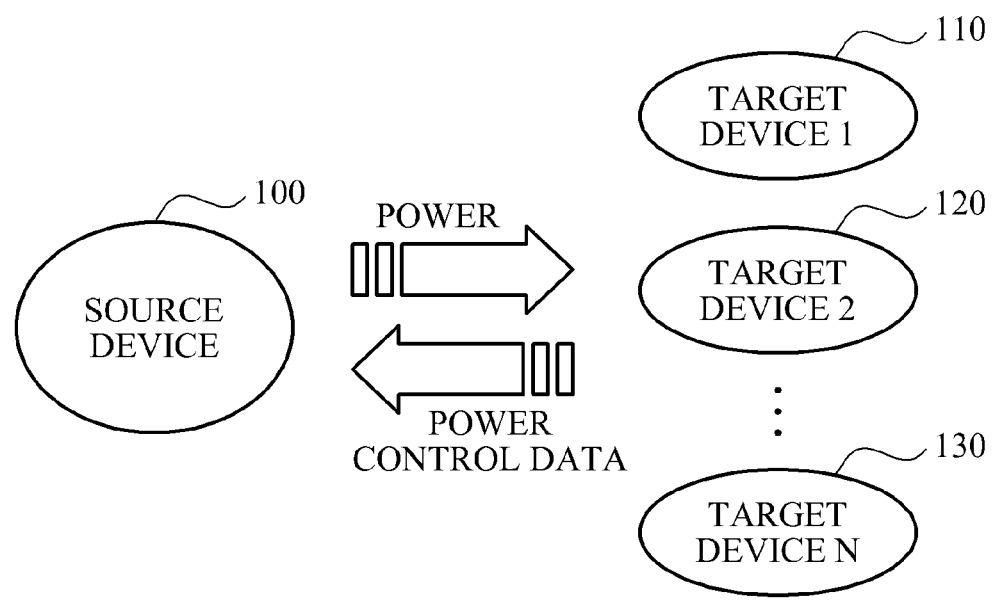
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of a wireless power transmission system.

Referring to FIG. 1, a source device 100 may transmit power to at least one target device, for example target devices 110, 120, and 130. For example, the source device 100 may generate resonance power, and may wirelessly transmit the resonance power to the target devices 110, 120, and 130. The source device 100 may include a source resonator to transmit a resonance power, and each of the target devices 110, 120, and 130 may include a target resonator. As an example, the source device 100 may be inserted as a module in a portable terminal such as a mobile terminal, a laptop computer, a personal digital assistant (PDA), a MP3 player, and the like. The target devices 110, 120, and 130 may transmit power control data to the source device 100. The power control data may be used to control transmission power.

Figure 2:
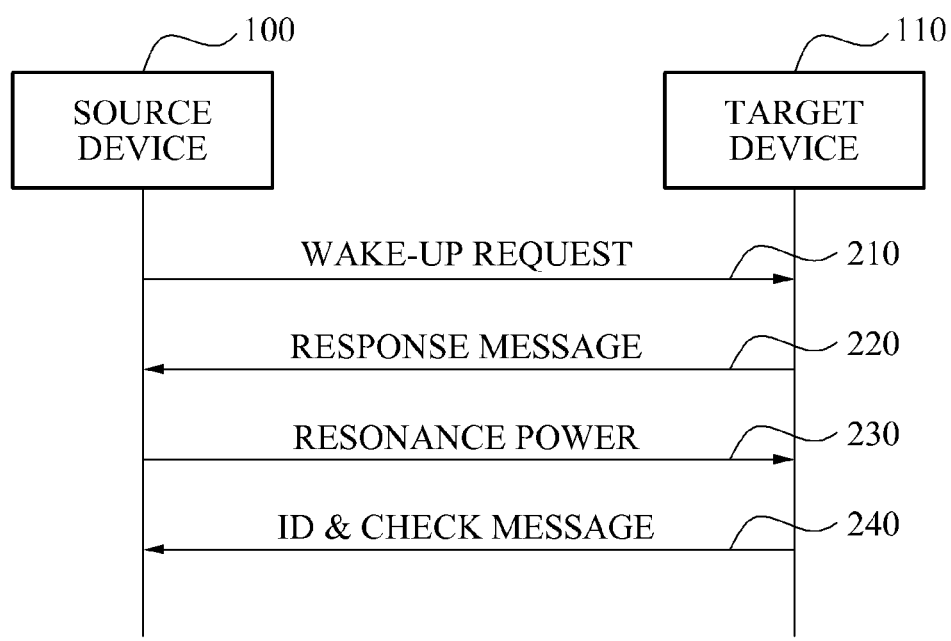
FIG. 2 is a diagram illustrating an example of a wireless power transmission control method.

FIG. 2 illustrates an example of a wireless power transmission control method.

Referring to FIG. 2, in 210, a source device 100 transmits a wake-up request signal to target device 110 to wake up the target device 110. In this example, the target device 110 is merely an example, and a plurality of target devices may exist. Additionally, the wake-up request signal may be used to search for a device that is operating at the same resonance frequency as the source device 100.

The wake-up request signal may include power used to switch the target device 110 to a power receiving mode. For example, the wake-up request signal may be transmitted in the form of a continuous wave (CW) of 20 MHz. For example, the CW may include an available power to activate a processor included in the target device 110 so that the processor may modulate a predetermined message.

In 220, the source device 100 receives a response message from the target device 110 that is activated by the wake-up request signal. For example, the response message may include an identification (ID) of the target device 110, and information about an amount of power used by the target device 110. For example, the information about an amount of power used by the target device may include information about an amount of power that the target device 110 is requesting from the source device 100. A format of the response message is further described with reference to FIG. 3.

In response to a response message not being received within a set period of time, the source device 100 may periodically transmit the wake-up request signal, and may detect whether devices exist around the source device 100.

In 230, the source device 100 sets a demand power based on the response message, and transmits a resonance power to the target device 110 based on the set demand power. For example, 230 may include demodulating the response message, verifying a used amount of current and a used amount of voltage of the target device 110 from the demodulated response message, and setting the demand power based on the used amount of current and the used amount of voltage of the target device 110. The used amount of current and the used amount voltage are examples of power control data.

The source device 100 may set the demand power based on the power control data received from the target device 110, and may transmit power corresponding to the demand power to the target device 110. As another example, the demand power may be set based on a number of target devices, and a reflected power. For example, the demand power may be set based on an example in which a plurality of target devices exist around the source device 100, or when a target device includes a plurality of charging units.

As another example, the source device 100 may receive information about the reflected power measured by the target device 110, and may set the demand power based on the received information about the reflected power measured by the target device 110.

In 240, the target device 110 transmits an ID of the target device 110 and a check message including a power receiving state of the target device 110, to the source device 100. For example, the target device 110 may transmit the ID of the target device 110, in real-time, or periodically, to the source device 100. The source device 100 may receive the ID of the target device 110 from the target device 110, in real-time, or periodically, and may determine that the target device 110 continues to exist. Additionally, the target device 110 may notify the source device 100 of the power receiving state in real-time, or periodically. For example, the power receiving state may include information about at least one of a battery charging state, whether a power is turned on or off, a reflected power amount, coupling information, and power consumption information.

Figure 3:
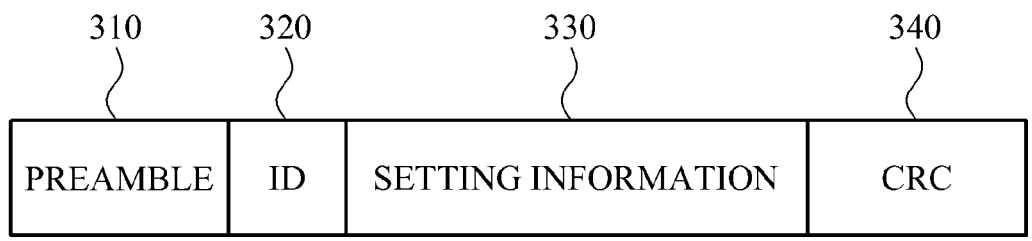
FIG. 3 is a diagram illustrating an example of a response message format.

FIG. 3 illustrates an example of a response message format.

Referring to FIG. 3, the response message includes a preamble 310, an ID 320, setting information 330, and a cyclic redundancy checking (CRC) 340.

For example, the preamble 310 may be one or more bits that are used to notify of a beginning and an end of the response message. For example, the preamble 310 may include values indicating a beginning and an end of the setting information 330 in the response message.

The ID 320 may be an identifier of a target device. Additionally, the ID 320 may include a type of target devices or product information. For example, the type of target devices may be determined based on whether target devices are household appliances or mobile products, whether a charging battery is detachably mounted, and the like.

The setting information 330 may include information used to set a demand power. For example, the setting information 300 may include information about a rated voltage used to operate a target device, a current used to operate a target device, a coupling rate, a coupling range, a reflected power amount, a charging state, and the like. The coupling rate may be defined as a ratio of an amount of power transmitted by the source device 100 in comparison to an amount of power received by the target device. For example, the coupling range may be defined as a minimum amount of power used to operate the target device.

The CRC 340 may be one or more parity bits that are used to determine whether an error occurs in the response message.

The response message format of FIG. 3 may be used as a format of the check message transmitted to the source device 100 in operation 240 shown in FIG. 2. In this example, the check message may further include information about a state of the target device.

The source device 100 may set the demand power based on the setting information 330 of FIG. 3. Accordingly, the source device 100 may set the demand power based on the information about the rated voltage and the current that is included in the setting information 330, and may transmit the set demand power. As another example, the source device 100 may determine an amount of power to be transmitted to the target device, based the coupling rate and the coupling range in the setting information 330.

Figure 4:
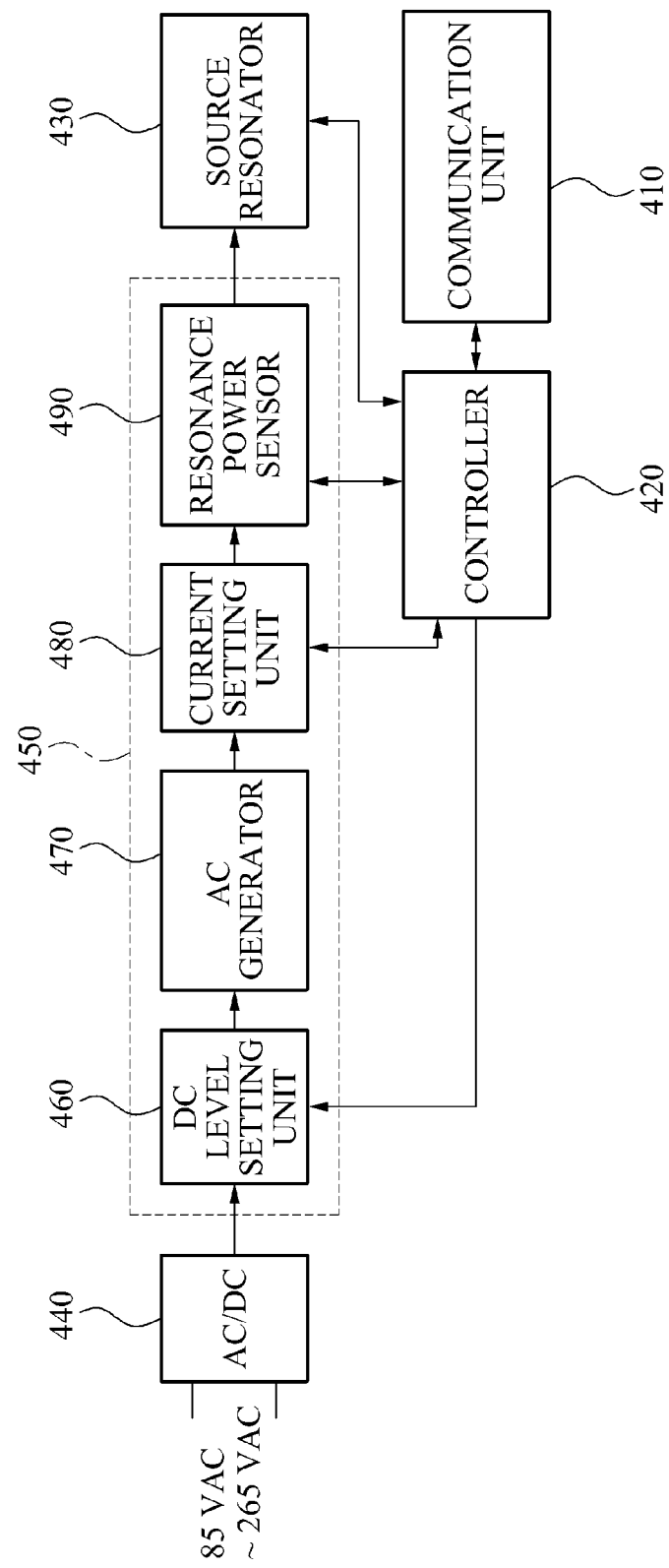
FIG. 4 is a diagram illustrating an example of a wireless power transmission control apparatus.

FIG. 4 illustrates an example of a wireless power transmission control apparatus. The wireless power transmission control apparatus of FIG. 4 may correspond to a source device of a wireless power transmission system.

Referring to FIG. 4, the wireless power transmission control apparatus includes a communication unit 410, a controller 420, and a source resonator 430. Additionally, the wireless power transmission control apparatus of FIG. 4 may further include an alternating current (AC)-to-direct current (DC) converter 440, and a resonance power generator 450. The resonance power generator 450 may generate resonance power, and may provide the generated resonance power to the source resonator 430. For example, the resonance power generator 450 may operated under a control of the controller 420. In this example, the resonance power generator 450 includes a DC level setting unit 460, an AC generator 470, a current setting unit 480, and a resonance power sensor 490.

The communication unit 410 may transmit a wake-up request signal to a target device to wake up the target device. The communication unit 410 may receive a response message from the target device that is activated by the wake-up request signal. In response to no errors being contained in the response message, the communication unit 410 may demodulate the response message, and may provide the controller 420 with an ID of the target device information about an amount of power used by the target device.

The controller 420 may control the DC level setting unit 460, the AC generator 470, the current setting unit 480, and the resonance power sensor 490 that are included in the resonance power generator 450. Additionally, the controller 420 may set a demand power based on the modulated response message. For example, the controller 420 may control the DC level setting unit 460 to set a voltage amount to be used by the target device.

The source resonator 430 may transmit resonance power corresponding to the demand power to the target device.

The AC-to-DC converter 440 may receive an AC voltage, for example, a voltage of approximately 85 to 265 volts (V), and may convert the received AC voltage into a DC voltage.

The DC level setting unit 460 may adjust a level of the DC voltage converted by the AC-to-DC converter 440. For example, the DC level setting unit 460 may set the voltage amount corresponding to the demand power. For example, the DC level setting unit 460 may adjust a voltage level to the voltage used by the target device, under the control of the controller 420.

The AC generator 470 may re-generate an AC voltage from the DC voltage that has the adjusted level. For example, the AC generator 470 may generate an AC voltage greater than 1 megahertz (MHz).

The current setting unit 480 may control a current amount of the AC voltage generated by the AC generator 470, under the control of the controller 420. For example, the current setting unit 480 may be controlled so that an amount of current used by the target device is generated. For example, the amount of current used by the target device may correspond to an amount of current that the target device would like to receive from the source device. For example, the current setting unit 480 may sense the amount of current in real-time, and may be controlled so that a constant voltage and a constant current are generated.

The resonance power sensor 490 may sense, in real-time, a power amount provided to the source resonator 430. For example, the controller 420 may control the resonance power sensor 490 to check the power amount sensed in real-time, so that a power may be stably transmitted.

In the example of FIG. 4, the source device may sense a current, a voltage, and a power amount in real-time, so that a system may be stably operated.

Figure 5:
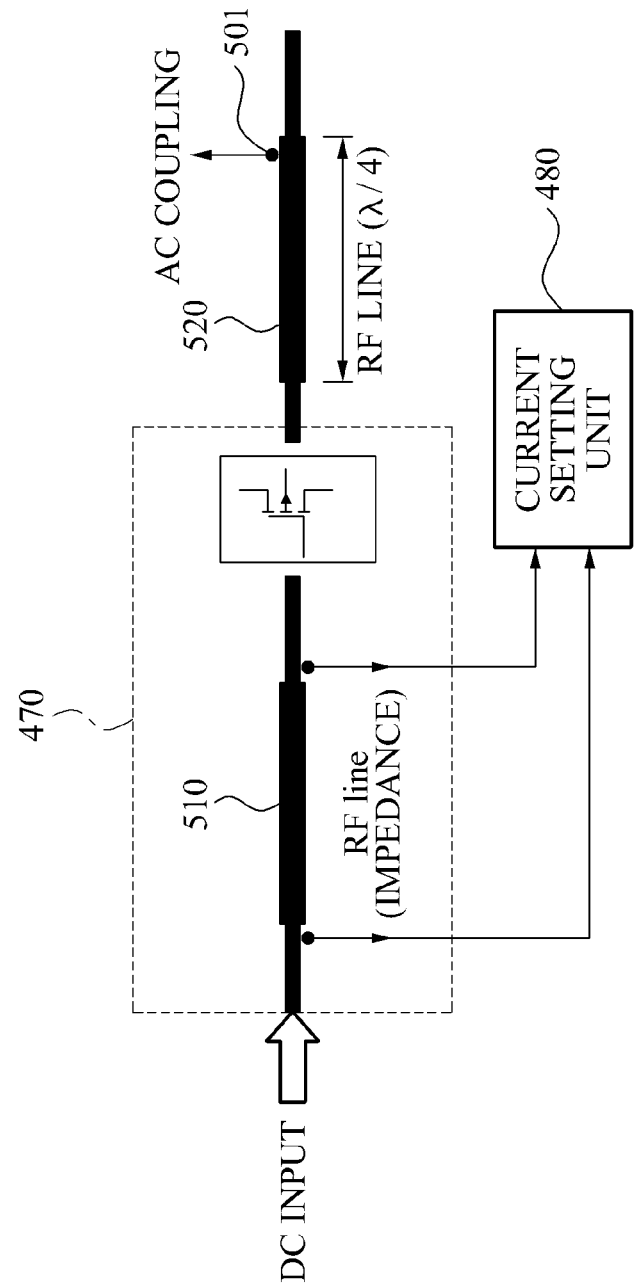
FIG. 5 is a diagram illustrating an example of an alternating current (AC) generator and a current setting unit of FIG. 4.

FIG. 5 illustrates an example of the AC generator 470 and the current setting unit 480 of FIG. 4.

Referring to FIG. 5, the AC generator 470 may include a radio frequency (RF) line 510. The current setting unit 480 may sense a power amount in real-time by measuring a current flowing in the RF line 510.

An output terminal of the AC generator 470 may include an RF line 520 with a length of $\lambda/4$. For example, in response to AC coupling being performed at a $\lambda/4$ point 501 of the RF line 520, an AC voltage and a power amount may be sensed. In this example, $\lambda$ indicates a wavelength of a resonance frequency. The AC coupling performed at the $\lambda/4$ point 501 may not affect a main signal, and may prevent impedance mismatching. For example, the AC coupling performed at the $\lambda/4$ point 501 may lead to an effective coupling of a constant amount of AC voltage. The resonance power sensor 490 may convert a coupled AC signal into a DC signal, and may detect a voltage level.

Figure 6:
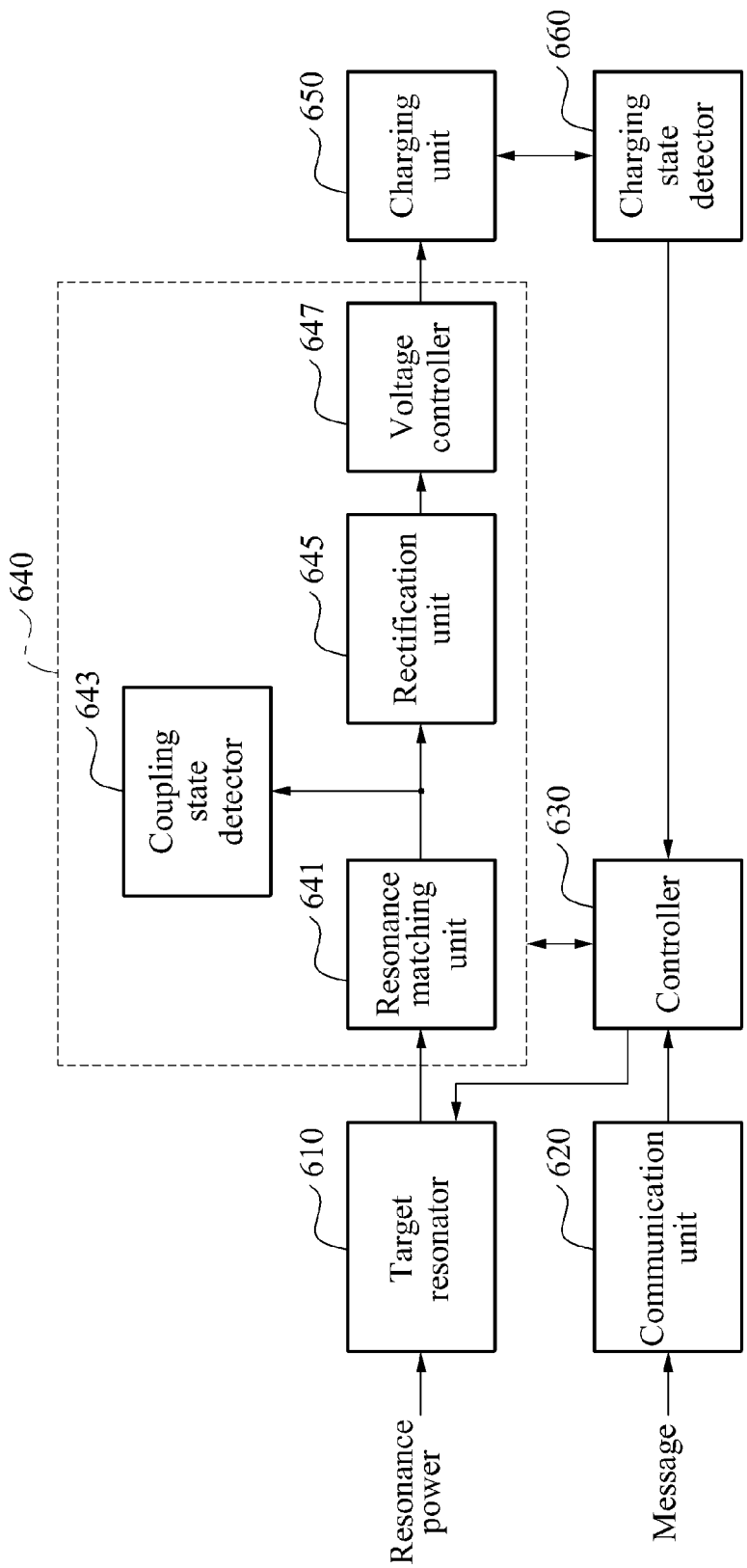
FIG. 6 is a diagram illustrating another example of a wireless power transmission control apparatus.

FIG. 6 illustrates another example of a wireless power transmission control apparatus. The wireless power transmission control apparatus of FIG. 6 may correspond to a target device of a wireless power transmission system. In this example, the wireless power transmission apparatus is also referred to as a target device.

Referring to FIG. 6, the wireless power transmission control apparatus includes a target resonator 610, a communication unit 620, and a controller 630. Additionally, the wireless power transmission control apparatus of FIG. 6 may further include a received power processor 640, a charging unit 650, and a charging state detector 660.

For example, the target resonator 610 may operate at the same resonance frequency as a source resonator, and may receive resonance power.

The communication unit 620 may receive a wake-up request signal from a source device. In response, the communication unit 620 may transmit a response message to the wake-up request signal to the source device.

The controller 630 may be activated by resonance power included in the wake-up request signal, and may generate the response message. For example, the controller 630 may generate a check message indicating a power consumption state of the target device. The controller 630 may control the communication unit 620 to periodically or aperiodically transmit, to the source device, a check message including an ID and a power receiving state of the target device.

For example, the communication unit 620 may transmit the check message to the source device to enable the source device to determine in real-time the amount of power desired by the wireless power transmission control apparatus.

The received power processor 640 may process power received by the target resonator 610, and may provide a DC voltage to the charging unit 650. In this example, the received power processor 640 includes a resonance matching unit 641, a coupling state detector 643, a rectification unit 645, and a voltage controller 647.

The resonance matching unit 641 may adjust a resonance frequency of the target resonator 610.

The coupling state detector 643 may detect a coupling rate between a source resonator and the target resonator 610, and may measure a reflected power by coupling the reflected power. The coupling state detector 643 may notify the controller 630 of the detected coupling rate, and a value obtained by measuring the reflected power.

The rectification unit 645 may generate a DC signal by rectifying a signal received by the target resonator 610.

The voltage controller 647 may adjust a level of the DC signal generated by the rectification unit 645. As another example, the voltage controller 647 may sense power provided to the charging unit 650, thereby preventing excessive power from being supplied.

The charging unit 650 may store resonance power, and may supply the resonance power to each load connected to a target device.

The charging state detector 660 may detect a charging state of the charging unit 650, and a charging completion state of the charging unit 650, and may notify the controller 630 of the result of the detection.

In the example of FIG. 6, a target device may detect a power receiving state, and the like, and may provide a detection result as feedback to a source device, so that a system may be stably operated, for example, in real-time.

According to various aspects, a source device may sense an AC power and a DC power, or a target device may sense a received power. As a result, it is possible to stably transmit power in a wireless power transmission system and to stably operate the wireless power transmission system. Additionally, it is possible to efficiently manage a demand power of the target device, and a transmission power of a source device. Furthermore, it is possible to identify the target device, and to control a transmission power based on a state of the target device.

For example, a source resonator and/or a target resonator may be configured as a helix coil structured resonator, a spiral coil structured resonator, a meta-structured resonator, and the like.

All materials may have a unique magnetic permeability (Mµ) and a unique permittivity epsilon (ε). The magnetic permeability indicates a ratio between a magnetic flux density that occurs with respect to a given magnetic field in a corresponding material and a magnetic flux density that occurs with respect to the given magnetic field in a vacuum state. The magnetic permeability and the permittivity may determine a propagation constant of a corresponding material at a given frequency or at given wavelength. An electromagnetic characteristic of the corresponding material may be determined based on the magnetic permeability and the permittivity.

For example, a material that has a magnetic permeability or a permittivity absent in nature and that is artificially designed is referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 7:
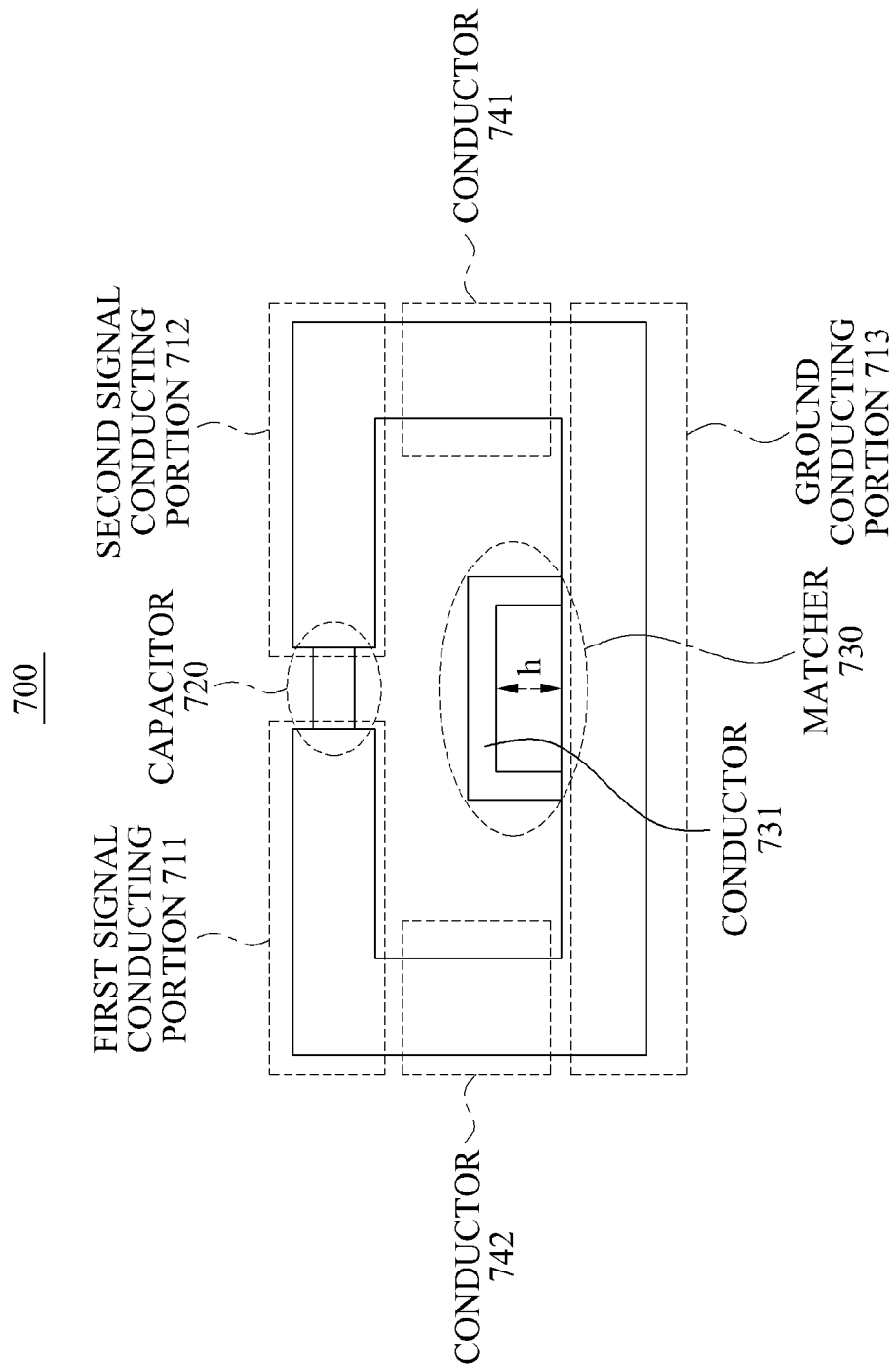

FIG. 7 illustrates a two-dimensional (2D) example of a resonator.

Referring to FIG. 7, resonator 700 includes a transmission line, a capacitor 720, a matcher 730, and conductors 741 and 742. In this example, the transmission line includes a first signal conducting portion 711, a second signal conducting portion 712, and a ground conducting portion 713.

The capacitor 720 may be inserted in series between the first signal conducting portion 711 and the second signal conducting portion 712, and an electric field may be confined within the capacitor 720. For example, the transmission line may include at least one conductor in an upper portion of the transmission line, and may also include at least one conductor in a lower portion of the transmission line. Current may flow through the at least one conductor disposed in the upper portion of the transmission line, and the at least one conductor disposed in the lower portion of the transmission may be electrically grounded. In this example, a conductor disposed in an upper portion of the transmission line is referred to as the first signal conducting portion 711 and the second signal conducting portion 712. A conductor disposed in the lower portion of the transmission line is referred to as the ground conducting portion 713.

In this example, the transmission line includes the first signal conducting portion 711 and the second signal conducting portion 712 in the upper portion of the transmission line, and includes the ground conducting portion 713 in the lower portion of the transmission line. For example, the first signal conducting portion 711 and the second signal conducting portion 712 may be disposed such that they face the ground conducting portion 713. Current may flow through the first signal conducting portion 711 and the second signal conducting portion 712.

One end of the first signal conducting portion 711 may be shorted to the conductor 742, and another end of the first signal conducting portion 711 may be connected to the capacitor 720. One end of the second signal conducting portion 712 may be grounded to the conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other, such that the resonator 700 has an electrically closed-loop structure. The term "loop structure" may include a polygonal structure, for example, a circular structure, a rectangular structure, and the like. The loop structure indicates a circuit that is electrically closed.

The capacitor 720 may be inserted into an intermediate portion of the transmission line. For example, the capacitor 720 may be inserted into a space between the first signal conducting portion 711 and the second signal conducting portion 712. The capacitor 720 may have various shapes, for example, a shape of a lumped element, a distributed element, and the like. For example, a distributed capacitor that has the shape of the distributed element may include zigzagged conductor lines and a dielectric material that has a relatively high permittivity between the zigzagged conductor lines.

When the capacitor 720 is inserted into the transmission line, the resonator 700 may have a property of a metamaterial. The metamaterial indicates a material that has a predetermined electrical property that is absent in nature, and thus, may have an artificially to designed structure. An electromagnetic characteristic of materials that exist in nature may have a unique magnetic permeability or a unique permittivity. Most materials may have a positive magnetic permeability or a positive permittivity. In the case of most materials, a right hand rule may be applied to an electric field, a magnetic field, and a pointing vector and thus, the corresponding materials may be referred to as right handed materials (RHMs).

However, a metamaterial has a magnetic permeability or a permittivity absent in nature, and thus, may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor inserted as the lumped element is appropriately determined, the resonator 700 may have the characteristic of the metamaterial. Because the resonator 700 may have a negative magnetic permeability by adjusting the capacitance of the capacitor 720, the resonator 700 may also be referred to as an MNG resonator. Various criteria may be applied to determine the capacitance of the capacitor 720. For example, the various criteria may include a criterion for enabling the resonator 700 to have the characteristic of the metamaterial, a criterion for enabling the resonator 700 to have a negative magnetic permeability in a target frequency, a criterion for enabling the resonator 700 to have a zeroth order resonance characteristic in the target frequency, and the like. The capacitance of the capacitor 720 may be determined based on at least one criterion.

The resonator 700, also referred to as the MNG resonator 700, may have a zeroth order resonance characteristic that has, as a resonance frequency, a frequency when a propagation constant is "0". For example, a zeroth order resonance characteristic may be a frequency transmitted through a line or a medium that has a propogation constant of zero. Because the resonator 700 may have the zeroth order resonance characteristic, the resonance frequency may be independent with respect to a physical size of the MNG resonator 700. By appropriately designing the capacitor 720, the MNG resonator 700 may sufficiently change the resonance frequency. Accordingly, the physical size of the MNG resonator 700 may not be changed.

In a near field, the electric field may be concentrated on the capacitor 720 inserted into the transmission line. Accordingly, due to the capacitor 720, the magnetic field may become dominant in the near field. The MNG resonator 700 may have a relatively high Q-factor using the capacitor 720 of the lumped element and thus, it is possible to enhance an efficiency of power transmission. In this example, the Q-factor indicates a level of an ohmic loss or a ratio of a reactance with respect to a resistance in the wireless power transmission. It should be understood that the efficiency of the wireless power transmission may increase according to an increase in the Q-factor.

The MNG resonator 700 may include the matcher 730 for impedance matching. The matcher 730 may adjust the strength of a magnetic field of the MNG resonator 700. An impedance of the MNG resonator 700 may be determined by the matcher 730. For example, current may flow into and/or out of the MNG resonator 700 via a connector. The connector may be connected to the ground conducting portion 713 or the matcher 730. Power may be transferred through coupling without using a physical connection between the connector and the ground conducting portion 713 or the matcher 730.

For example, as shown in FIG. 7, the matcher 730 may be positioned within the loop formed by the loop structure of the resonator 700. The matcher 730 may adjust the impedance of the resonator 700 by changing the physical shape of the matcher 730. For example, the matcher 730 may include the conductor 731 for the impedance matching in a location that is separated from the ground conducting portion 713 by a distance h. The impedance of the resonator 700 may be changed by adjusting the distance h.

Although not illustrated in FIG. 7, a controller may be provided to control the matcher 730. In this example, the matcher 730 may change the physical shape of the matcher 730 based on a control signal generated by the controller. For example, the distance h between the conductor 731 of the matcher 730 and the ground conducting portion 713 may increase or decrease based on the control signal. Accordingly, the physical shape of the matcher 730 may be changed and the impedance of the resonator 700 may be adjusted. The controller may generate the control signal based on various factors, which is further described later.

As shown in FIG. 7, the matcher 730 may be a passive element such as the conductor 731. As another example, the matcher 730 may be an active element such as a diode, a transistor, and the like. When the active element is included in the matcher 730, the active element may be driven based on the control signal generated by the controller, and the impedance of the resonator 700 may be adjusted based on the control signal. For example, a diode that is a type of active element may be included in the matcher 730. The impedance of the resonator 700 may be adjusted depending on whether the diode is in an ON state or in an OFF state.

Although not illustrated in FIG. 7, a magnetic core may pass through the MNG resonator 700. The magnetic core may increase a power transmission distance.

Figure 8:
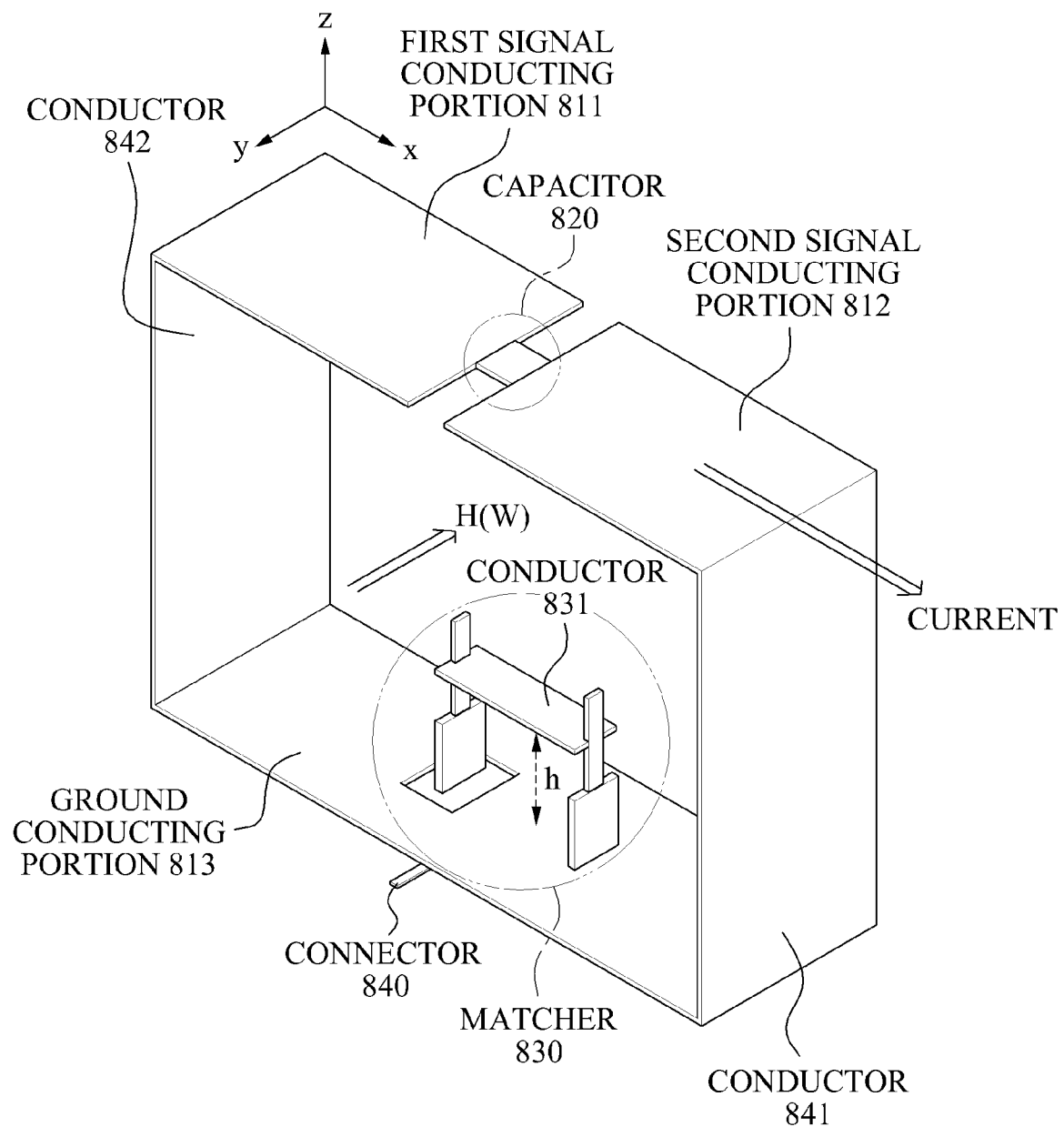

FIG. 8 illustrates a three-dimensional (3D) example of a resonator.

Referring to FIG. 8, resonator 800 includes a transmission line and a capacitor 820. In this example, the transmission line includes a first signal conducting portion 811, a second signal conducting portion 812, and a ground conducting portion 813. The capacitor 820 may be inserted in series between the first signal conducting portion 811 and the second signal conducting portion 812 of the transmission line, and an electric field may be confined within the capacitor 820.

In this example, the transmission line includes the first signal conducting portion 811 and the second signal conducting portion 812 in an upper portion of the resonator 800, and includes the ground conducting portion 813 in a lower portion of the resonator 800. For example, the first signal conducting portion 811 and the second signal conducting portion 812 may be disposed such that they face the ground conducting portion 813. Current may flow in an x direction through the first signal conducting portion 811 and the second signal conducting portion 812. As a result of the current, a magnetic field H(W) may be formed in a −y direction. Alternatively, unlike the diagram of FIG. 8, the magnetic field H(W) may be formed in a +y direction.

One end of the first signal conducting portion 811 may be shorted to the conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other such that the resonator 800 has an electrically closed-loop structure as described with reference to FIG. 7.

As shown in FIG. 8, the capacitor 820 may be inserted between the first signal conducting portion 811 and the second signal conducting portion 812. For example, the capacitor 820 may be inserted into a space between the first signal conducting portion 811 and the second signal conducting portion 812. The capacitor 820 may have various shapes, for example, a shape of a lumped element, a distributed element, and the like. For example, a distributed capacitor that has the shape of the distributed element may include zigzagged conductor lines and a dielectric material that has a relatively high permittivity between the zigzagged conductor lines.

As the capacitor 820 is inserted into the transmission line, the resonator 800 may have a property of a metamaterial.

When a capacitance of the capacitor inserted as the lumped element is appropriately determined, the resonator 800 may have the characteristic of the metamaterial. Because the resonator 800 may have a negative magnetic permeability by adjusting the capacitance of the capacitor 820, the resonator 800 may also be referred to as an MNG resonator. Various criteria may be applied to determine the capacitance of the capacitor 820. For example, the various criteria may include a criterion for enabling the resonator 800 to have the characteristic of the metamaterial, a criterion for enabling the resonator 800 to have a negative magnetic permeability in a target frequency, a criterion enabling the resonator 800 to have a zeroth order resonance characteristic in the target frequency, and the like. The capacitance of the capacitor 820 may be determined based on at least one criterion.

The resonator 800, also referred to as the MNG resonator 800, may have a zeroth order resonance characteristic that has, as a resonance frequency, a frequency when a propagation constant is "0". Because the resonator 800 may have the zeroth order resonance characteristic, the resonance frequency may be independent with respect to a physical size of the MNG resonator 800. By appropriately designing the capacitor 820, the MNG resonator 800 may sufficiently change the resonance frequency. Accordingly, the physical size of the MNG resonator 800 may not be changed.

Referring to the MNG resonator 800 of FIG. 8, in a near field, the electric field may be concentrated on the capacitor 820 inserted into the transmission line. Accordingly, due to the capacitor 820, the magnetic field may become dominant in the near field. For example, because the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820 and thus, the magnetic field may become further dominant.

Also, the MNG resonator 800 may include the matcher 830 for impedance matching. The matcher 830 may adjust the strength of magnetic field of the MNG resonator 800. An impedance of the MNG resonator 800 may be determined by the matcher 830. For example, current may flow into and/or out of the MNG resonator 800 via a connector 840. The connector 840 may be connected to the ground conducting portion 813 or the matcher 830.

For example, as shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 for the impedance matching in a location that is separated from the ground conducting portion 813 by a distance h. Accordingly, the impedance of the resonator 800 may be changed by adjusting the distance h.

Although not illustrated in FIG. 8, a controller may be provided to control the matcher 830. In this example, the matcher 830 may change the physical shape of the matcher 830 based on a control signal generated by the controller. For example, the distance h between the conductor 831 of the matcher 830 and the ground conducting portion 813 may increase or decrease based on the control signal. Accordingly, the physical shape of the matcher 830 may be changed and the impedance of the resonator 800 may be adjusted.

The distance h between the conductor 831 of the matcher 830 and the ground conducting portion 831 may be adjusted using a variety of schemes. For example, a plurality of conductors may be included in the matcher 830 and the distance h may be adjusted by adaptively activating one of the conductors. As another example, the distance h may be adjusted by adjusting the physical location of the conductor 831 up and down. The distance h may be controlled based on the control signal of the controller. For example, the controller may generate the control signal using various factors. An example of the controller generating the control signal is further described later.

As shown in FIG. 8, the matcher 830 may be a passive element such as the conductor 831. As another example, the matcher 830 may be an active element such as a diode, a transistor, and the like. When the active element is included in the matcher 830, the active element may be driven based on the control signal generated by the controller, and the impedance of the resonator 800 may be adjusted based on the control signal. For example, a diode that is an active element may be included in the matcher 830. The impedance of the resonator 800 may be adjusted depending on whether the diode is in an ON state or in an OFF state.

Although not illustrated in FIG. 8, a magnetic core may pass through the resonator 800 configured as the MNG resonator. The magnetic core may increase a power transmission distance.

Figure 9:
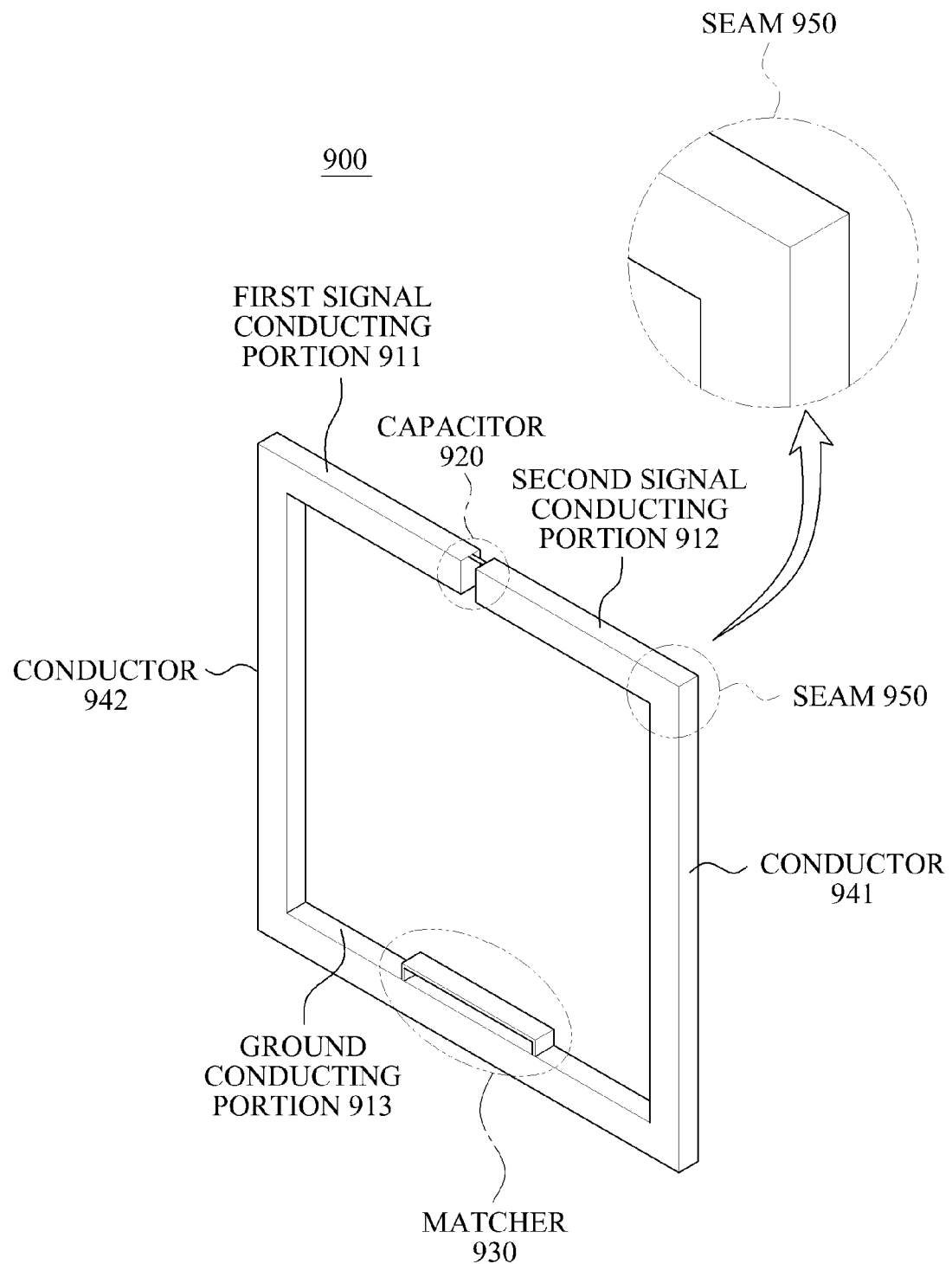

FIG. 9 illustrates an example of a bulky-type resonator for wireless power transmission.

Referring to FIG. 9, a first signal conducting portion 911 and a second signal conducting portion 912 may be integrally formed instead of being separately manufactured and later connected to each other. Similarly, the second signal conducting portion 912 and the conductor 941 may also be integrally manufactured.

When the second signal conducting portion 912 and the conductor 941 are separately manufactured and connected to each other, a loss of conduction may occur due to a seam 950. The second signal conducting portion 912 and the conductor 941 may be connected to each other without using a separate seam such that they are seamlessly connected to each other. Accordingly, it is possible to decrease a conductor loss caused by the seam 950. Accordingly, the second signal conducting portion 912 and the ground conducting portion 931 may be seamlessly and integrally manufactured. Similarly, the first signal conducting portion 911 and the ground conducting portion 931 may be seamlessly and integrally manufactured.

Referring to FIG. 9, a type of a seamless connection connecting at least two partitions into an integrated form is referred to as a bulky-type.

Figure 10:
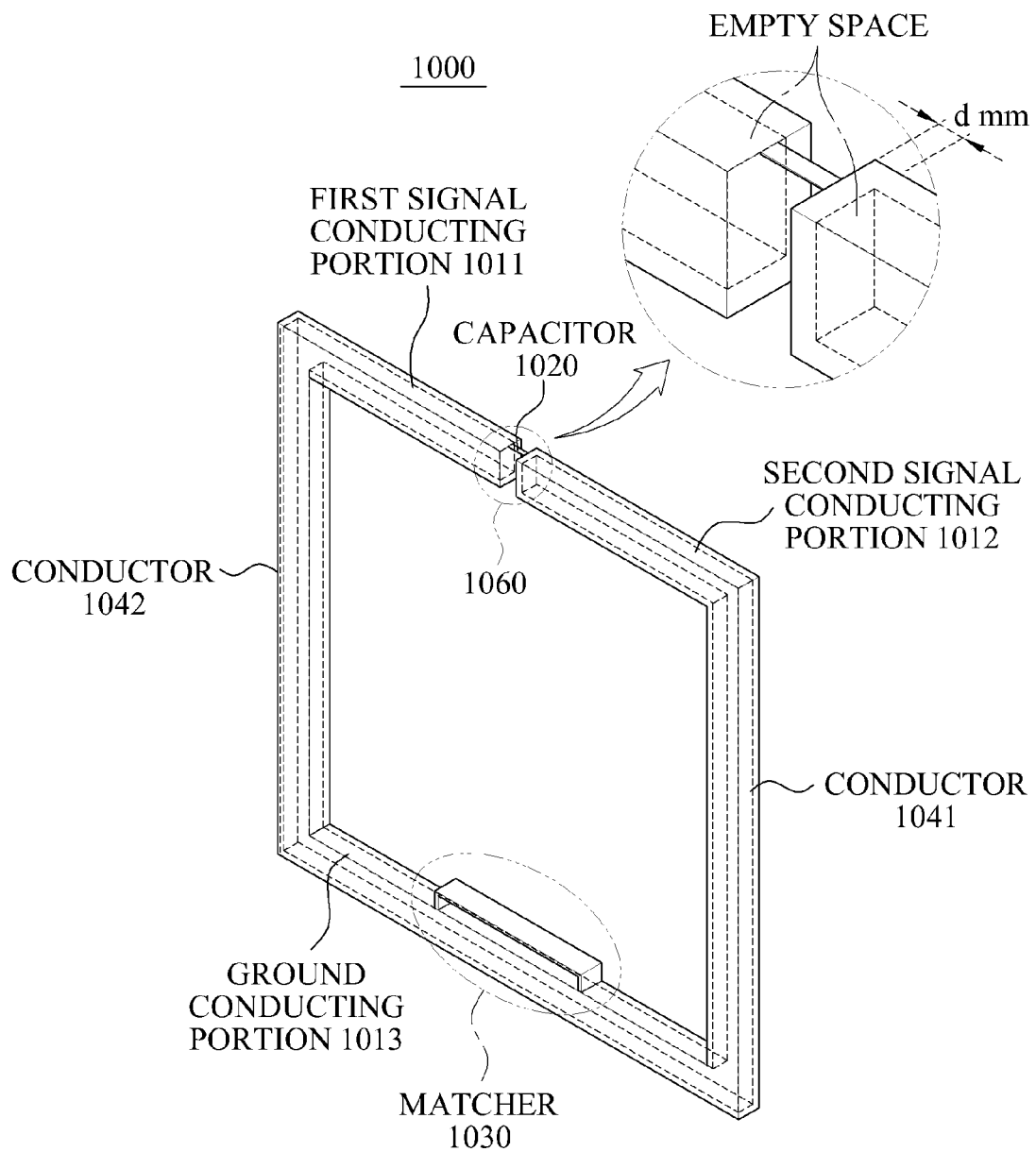

FIG. 10 illustrates an example of a hollow-type resonator for wireless power transmission.

Referring to FIG. 10, each of a first signal conducting portion 1011, a second signal conducting portion 1012, a ground conducting portion 1013, and conductors 1041 and 1042 of the resonator 1000 configured as the hollow-type include an empty space inside.

In a given resonance frequency, an active current may be modeled to flow in only a portion of the first signal conducting portion 1011 instead of the entire first signal conducting portion 1011, in only a portion of the second signal conducting portion 1012 instead of the entire second signal conducting portion 1012, in only a portion of the ground conducting portion 1013 instead of the entire ground conducting portion 1013, and in only a portion of the conductors 1041 and 1042 instead of the entire conductors 1041 and 1042. For example, when a depth of each of the first signal conducting portion 1011, the second signal conducting portion 1012, the ground conducting portion 1013, and the conductors 1041 and 1042 is significantly deeper than a corresponding skin depth in the given resonance frequency, it may be ineffective. The significantly deeper depth may increase a weight or manufacturing costs of the resonator 1000.

Accordingly, in the given resonance frequency, the depth of each of the first signal conducting portion 1011, the second signal conducting portion 1012, the ground conducting portion 1013, and the conductors 1041 and 1042 may be appropriately determined based on the corresponding skin depth of each of the first signal conducting portion 1011, the second signal conducting portion 1012, the ground conducting portion 1013, and the conductors 1041 and 1042. When the first signal conducting portion 1011, the second signal conducting portion 1012, the ground conducting portion 1013, and the conductors 1041 and 1042 have an appropriate depth that is deeper than a corresponding skin depth, the resonator 1000 may become light, and manufacturing costs of the resonator 1000 may also decrease.

For example, as shown in FIG. 10, the depth of the second signal conducting portion 1012 may be determined as "d" mm and d may be determined according to $$d = \frac{1}{\sqrt{\pi f \mu \sigma}}.$$

In this example, f denotes a frequency, μ denotes a magnetic permeability, and σ denotes a conductor constant.

For example, when the first signal conducting portion 1011, the second signal conducting portion 1012, the ground conducting portion 1013, and the conductors 1041 and 1042 are made of a copper and have a conductivity of $5.8 \times 10^7$ siemens per meter ($S \cdot m^{-1}$), the skin depth may be about 0.6 mm with respect to 10 kHz of the resonance frequency and the skin depth may be about 0.006 mm with respect to 100 MHz of the resonance frequency.

Figure 11:
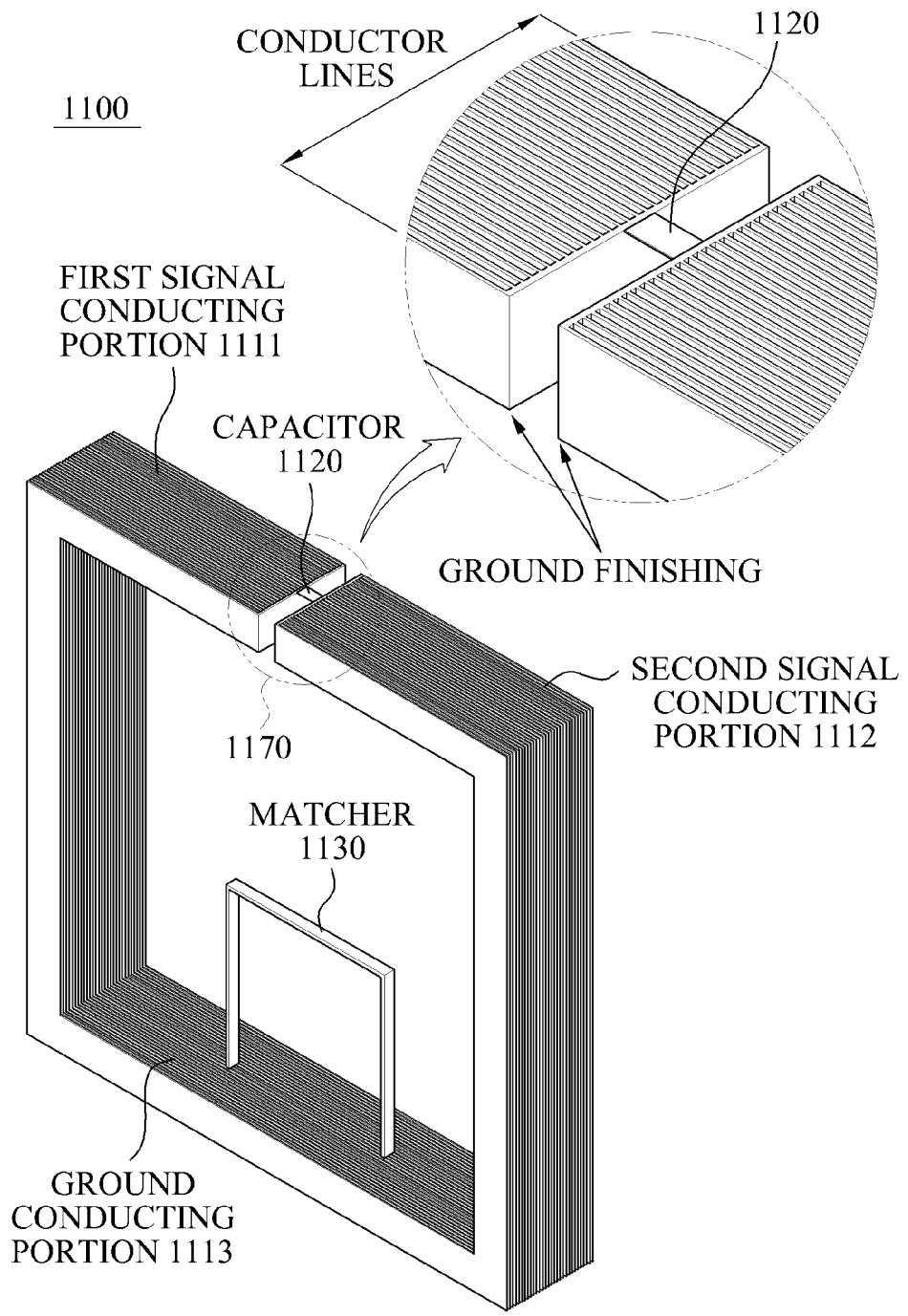

FIG. 11 illustrates an example of a resonator for wireless power transmission using a parallel-sheet.

Referring to FIG. 11, the parallel-sheet may be applicable to each of a first signal conducting portion 1111 and a second signal conducting portion 1112 included in the resonator 1100.

For example, the first signal conducting portion 1111 and the second signal conducting portion 1112 may not be a perfect conductor, and thus, may have a resistance. Due to the resistance, an ohmic loss may occur. The ohmic loss may decrease a Q-factor and may also decrease a coupling effect.

By applying the parallel-sheet to each of the first signal conducting portion 1111 and the second signal conducting portion 1112, it is possible to decrease the ohmic loss, and to increase the Q-factor and the coupling effect. For example, referring to a portion 1170 indicated by a circle, when the parallel-sheet is applied, each of the first signal conducting portion 1111 and the second signal conducting portion 1112 may include a plurality of conductor lines. For example, the plurality of conductor lines may be disposed in parallel, and may be shorted at an end portion of each of the first signal conducting portion 1111 and the second signal conducting portion 1112.

As described above, when the parallel-sheet is applied to each of the first signal conducting portion 1111 and the second signal conducting portion 1112, the plurality of conductor lines may be disposed in parallel. Accordingly, a sum of resistances having the conductor lines may decrease. As a result, the resistance loss may decrease, and the Q-factor and the coupling effect may increase.

FIG. 12 illustrates an example of a resonator for wireless power transmission, including a distributed capacitor.

Referring to FIG. 12, a capacitor 1220 included in the resonator 1200 for the wireless power transmission may be a distributed capacitor. A capacitor as a lumped element may have a relatively high equivalent series resistance (ESR). A variety of schemes have been proposed to decrease the ESR contained in the capacitor of the lumped element. For example, by using the capacitor 1220 as a distributed element, it is possible to decrease the ESR. A loss caused by the ESR may decrease a Q-factor and a coupling effect.

As shown in FIG. 12, the capacitor 1220 as the distributed element may have a zigzagged structure. For example, the capacitor 1220 as the distributed element may be configured as a conductive line and a conductor having the zigzagged structure.

As shown in FIG. 12, by employing the capacitor 1220 as the distributed element, it is possible to decrease the loss that occurs due to the ESR. In addition, by disposing a plurality of capacitors as lumped elements, it is possible to decrease the loss that occurs due to the ESR. Because a resistance of each of the capacitors as the lumped elements decreases through a parallel connection, active resistances of parallel-connected capacitors as the lumped elements may also decrease and the loss that occurs due to the ESR may decrease. For example, by employing ten capacitors of 1 pF instead of using a single capacitor of 10 pF, it is possible to decrease the loss occurring due to the ESR.

Figure 13A:
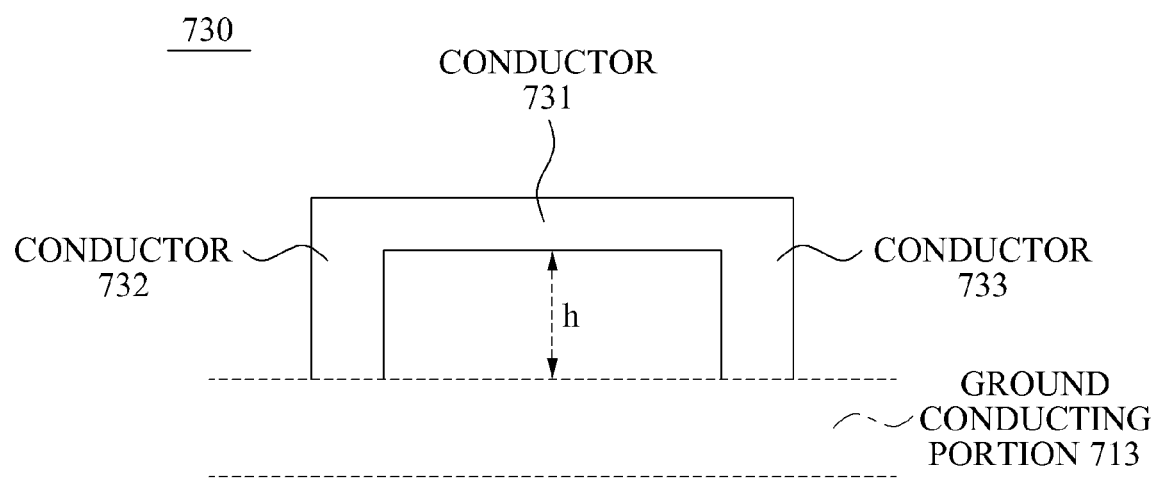
Figure 13B:
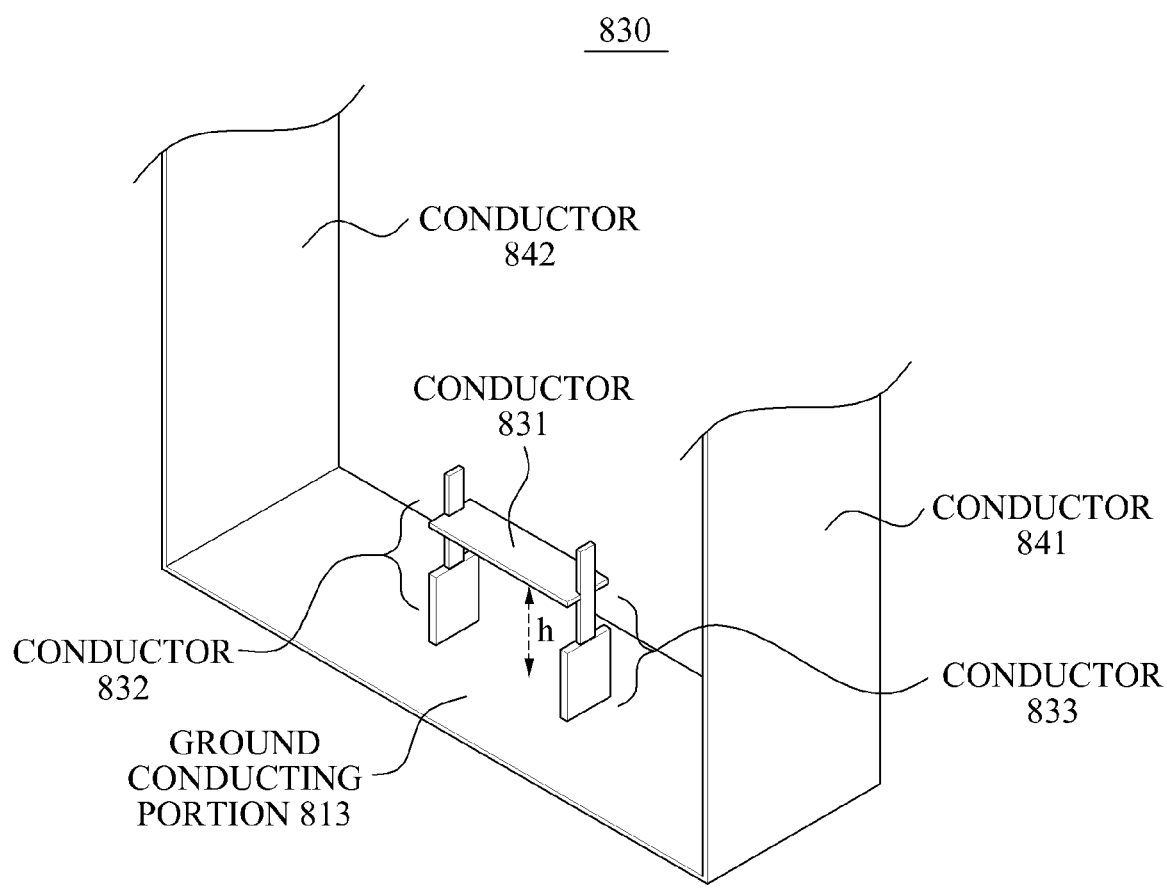

FIG. 13A illustrates an example of the matcher 730 used in the resonator 700 of FIG. 7, and FIG. 13B illustrates an example of the matcher 830 used in the resonator 800 of FIG. 8.

FIG. 13A illustrates a portion of the 2D resonator example including the matcher 730, and FIG. 13B illustrates a portion of the 3D resonator example including the matcher 830.

Referring to FIG. 13A, the matcher 730 includes a conductor 731, a conductor 732, and a conductor 733. The conductors 732 and 733 may be connected to the ground conducting portion 713 and the conductor 731. The impedance of the 2D resonator may be determined based on a distance h between the conductor 731 and the ground conducting portion 713. For example, the distance h between the conductor 731 and the ground conducting portion 713 may be controlled by the controller. The distance h between the conductor 731 and the ground conducting portion 713 may be adjusted using a variety of schemes. For example, the variety of schemes may include a scheme of adjusting the distance h by adaptively activating one of the conductors 731, 732, and 733, a scheme of adjusting the physical location of the conductor 731 up and down, and the like.

Referring to FIG. 13B, the matcher 830 includes a conductor 831, a conductor 832, and a conductor 833. The conductors 832 and 833 may be connected to the ground conducting portion 813 and the conductor 831. The conductors 832 and 833 may be connected to the ground conducting portion 813 and the conductor 831. The impedance of the 3D resonator may be determined based on a distance h between the conductor 831 and the ground conducting portion 813. For example, the distance h between the conductor 831 and the ground conducting portion 813 may be controlled by the controller. Similar to the matcher 730 included in the 2D resonator example, in the matcher 830 included in the 3D resonator example, the distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Although not illustrated in FIGS. 13A and 13B, the matcher may include an active element. A scheme of adjusting an impedance of a resonator using the active element may be similar as described above. For example, the impedance of the resonator may be adjusted by changing a path of current flowing through the matcher using the active element.

Figure 14:
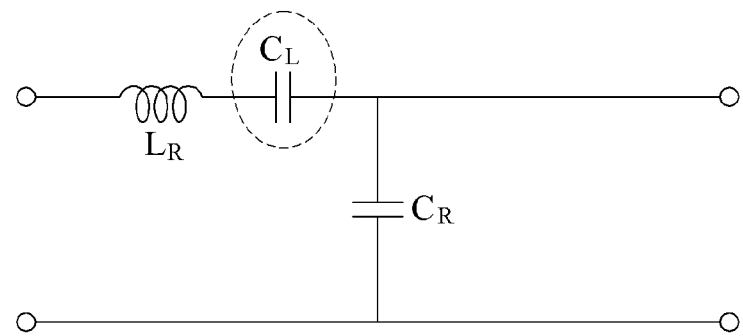
FIG. 14 is a diagram illustrating an example of an equivalent circuit of the resonator for a wireless power transmission of FIG. 7.

FIG. 14 illustrates an example of an equivalent circuit of the resonator 700 for wireless power transmission of FIG. 7.

The resonator 700 for the wireless power transmission may be modeled to the equivalent circuit of FIG. 14. In the equivalent circuit of FIG. 14, $C_L$ denotes a capacitor that is inserted in a form of a lumped element in the middle of the transmission line of FIG. 7.

In this example, the resonator 700 may have a zeroth resonance characteristic. For example, when a propagation constant is "0", the resonator 700 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \quad \text{[Equation 2]}$$

In Equation 2, MZR denotes a Mu zero resonator.

Referring to Equation 2, the resonance frequency $\omega_{MZR}$ of the resonator 700 may be determined by $L_R/C_L$. A physical size of the resonator 700 and the resonance frequency $\omega_{MZR}$ may be independent with respect to each other. Because the physical sizes are independent with respect to each other, the physical size of the resonator 700 may be sufficiently reduced.

In various aspects, a wireless power transmission control method includes transmitting a wake-up request signal used to wake up a target device, receiving a response message from the target device activated by the wake-up request signal, setting a demand power based on the response message, and transmitting a resonance power to the target device based on the demand power.

In various aspects, a wireless power transmission control apparatus includes a communication unit to transmit a wake-up request signal, and to receive a response message from a target device activated by the wake-up request signal. The wake-up request signal may be used to wake up the target device. The wireless power transmission control apparatus includes a controller to set a demand power based on the response message, and a source resonator to transmit a resonance power to the target device. The resonance power may correspond to the demand power.

The wireless power transmission apparatus may sense a current, a voltage, and a power amount desired by a target, in real-time, and a constant voltage and a constant current may be generated and may be continuously supplied to one or more target devices in real-time.

In various aspects, a wireless power transmission control apparatus includes a target resonator operated at a same resonance frequency as a source resonator, a communication unit to receive a wake-up request signal from a source device, and to transmit a response message to the wake-up request signal to the source device, and a controller to generate the response message, the controller being activated by a resonance power included in the wake-up request signal. The response message may include an identification (ID) of a target device and information regarding a power used by the target device.

While the functionality of the source resonator and the target resonator are described separately, in certain embodiments, the source resonator may also function as a target resonator, and vice-versa.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmission control method, comprising:
    transmitting a wake-up request signal that is used to wake up a target device;
    receiving a response message comprising an identification (ID) of the target device and information about an amount of power to be used by the target device from the target device that is activated by the wake-up request signal;
    setting a demand power based on the response message;
    transmitting a resonance power to the target device based on the set demand power;
    receiving at least one check message including a power receiving state of the target device in real-time; and adjusting the resonance power based on the check message.

2. The wireless power transmission control method of claim 1, wherein the wake-up request signal comprises an amount of power used to switch a mode of the target device to a power receiving mode.

3. The wireless power transmission control method of claim 1, wherein the setting comprises:
demodulating the response message;
verifying an amount of current to be used and an amount of voltage to be used of the target device from the demodulated response message; and
setting the demand power based on the used amount of current and the used amount of voltage.

4. The wireless power transmission control method of claim 3, wherein the demand power is set based on a number of target devices and a reflected power that is reflected from at least one target device.

5. The wireless power transmission control method of claim 1, wherein the check message comprises the ID and a power receiving state of the target device.

6. The wireless power transmission control method of claim 5, wherein the power receiving state comprises at least one of information about a battery charging state, whether a power is turned on or off, a reflected power amount, coupling information, and power consumption information.

7. The wireless power transmission control method of claim 1, wherein resonance power is transmitted to the target device to supply the target device with a desired amount of power in real-time.

8. A wireless power transmission control apparatus, comprising:
a communication unit configured to transmit a wake-up request signal to wake up a target device, to receive a response message comprising an identification (ID) of the target device and information about an amount of power to be used by the target device from the target device activated by the wake-up request signal, and to receive at least one check message including a power receiving state of the target device in real-time;
a controller configured to set a demand power based on the response message; and
a source resonator configured to transmit resonance power corresponding to the demand power, to the target device,
wherein the controller is further configured to adjust the resonance power based on the check message.

9. The wireless power transmission control apparatus of claim 8, wherein the wake-up request signal comprises a power used to switch a mode of the target device to a power receiving mode.

10. The wireless power transmission control apparatus of claim 8, further comprising:
a direct current (DC) level setting unit to set a voltage corresponding to the demand power;
a current setting unit to set a current corresponding to the demand power; and
a resonance power sensor to sense, in real-time, the resonance power transmitted to the target device.

11. The wireless power transmission control apparatus of claim 10, wherein the resonance power sensor senses the resonance power transmitted to the target device, in real-time, using an alternating current (AC) power that is coupled at a $\lambda/4$ point in a radio frequency (RF) line, wherein $\lambda$ denotes a wavelength of a resonance frequency.

12. A wireless power transmission control apparatus, comprising:
a target resonator operated at a same resonance frequency as a source resonator;
a communication unit configured to receive, from a source device, a wake-up request signal to wake up the power transmission control apparatus, to transmit a response message to the wake-up request signal to the source device, and to transmit at least one check message include a power receiving state of the target device in real-time; and
a controller that is activated by a resonance power comprised in the wake-up request signal, and configured to generate the response message,
wherein the response message comprises an identification (ID) of the power transmission control apparatus and information about an amount of power to be used by the power transmission control apparatus, and
wherein the resonance power is adjusted by the source device in accordance with the check message.

13. The wireless power transmission control apparatus of claim 11, further comprising:
a coupling state detector to detect a coupling state between the source resonator and the target resonator.

14. The wireless power transmission control apparatus of claim 11, further comprising:
a charging state detector to detect a charging state of the power transmission control apparatus.

15. The wireless power transmission control apparatus of claim 11, wherein the controller controls the communication unit to periodically or aperiodically transmit a check message comprising the ID and a power receiving state of the power transmission control apparatus.

* * * * *